(12) United States Patent
Mody et al.

(10) Patent No.: US 12,166,520 B2
(45) Date of Patent: Dec. 10, 2024

(54) CASE WITH ILLUSORY DESIGN ELEMENTS

(71) Applicant: CASE-MATE, INC., Atlanta, GA (US)

(72) Inventors: Saumil Chetan Mody, Atlanta, GA (US); Jianzhi Chen, Cumming, GA (US)

(73) Assignee: Case-Mate, Inc., Atlanta, GA (US)

( * ) Notice: Subject to any disclaimer, the term of this patent is extended or adjusted under 35 U.S.C. 154(b) by 413 days.

(21) Appl. No.: 17/451,847

(22) Filed: Oct. 22, 2021

(65) Prior Publication Data

US 2023/0130931 A1    Apr. 27, 2023

(51) Int. Cl.
| | | |
|---|---|---|
| *H04B 1/3888* | (2015.01) | |
| *G03H 1/00* | (2006.01) | |
| *H04M 1/04* | (2006.01) | |

(52) U.S. Cl.
CPC ......... *H04B 1/3888* (2013.01); *G03H 1/0005* (2013.01); *H04M 1/04* (2013.01); *G03H 2001/0055* (2013.01); *G03H 2227/02* (2013.01)

(58) Field of Classification Search
CPC .............................. H04B 1/3888; H04M 1/04
See application file for complete search history.

(56) References Cited

U.S. PATENT DOCUMENTS

| | | | | |
|---|---|---|---|---|
| 4,073,853 A | * | 2/1978 | Chestnov | B44F 7/00 |
| | | | | 428/156 |
| 4,505,968 A | * | 3/1985 | Ishii | B32B 3/00 |
| | | | | 428/913 |
| 5,354,596 A | * | 10/1994 | Chew | B44C 5/04 |
| | | | | 427/430.1 |
| D854,533 S | | 7/2019 | Thompson et al. | |
| 10,541,714 B2 | | 1/2020 | Mody | |
| 2002/0110683 A1 | * | 8/2002 | Lehtonen | G02B 5/286 |
| | | | | 428/210 |
| 2003/0203691 A1 | * | 10/2003 | Fenwick | D04H 3/16 |
| | | | | 442/205 |
| 2004/0166258 A1 | * | 8/2004 | Mau | G02B 30/40 |
| | | | | 428/34.1 |
| 2006/0194024 A1 | * | 8/2006 | Nakayama | B32B 3/14 |
| | | | | 428/195.1 |

(Continued)

FOREIGN PATENT DOCUMENTS

| | | | |
|---|---|---|---|
| JP | H07112600 A | * | 5/1995 |
| JP | H11128829 A | * | 5/1999 |

(Continued)

*Primary Examiner* — Gennadiy Tsvey
(74) *Attorney, Agent, or Firm* — Perilla Knox & Hildebrandt LLP (57) ABSTRACT

A case having the appearance of 3D design elements embedded therein. The case generally comprises a back panel which incorporates a plurality of layers with impressions or recesses formed thereon. When aligned, the impressions create an optical illusion as if actual objects are embedded in the back panel of the case where no actual object is present. And a method of producing an optical illusion of embedded design elements in a case including the steps of forming a first panel with at least one first impression formed on a first side of the first panel, applying a reflective coating to the at least one first impression, forming a second panel, and joining the second panel to the first side of the first panel.

8 Claims, 8 Drawing Sheets

(56) References Cited

U.S. PATENT DOCUMENTS

| | | | |
|---|---|---|---|
| 2013/0140806 A1* | 6/2013 | Wilkinson | B41M 7/0045 |
| | | | 428/206 |
| 2014/0037898 A1* | 2/2014 | Tompkin | B29D 11/0074 |
| | | | 428/141 |
| 2014/0178625 A1* | 6/2014 | Lauper | A44C 17/04 |
| | | | 29/10 |
| 2017/0129275 A1* | 5/2017 | Burke | B44C 3/04 |
| 2018/0320859 A1 | 11/2018 | Philip et al. | |
| 2020/0223114 A1* | 7/2020 | Gomez | G03H 1/0011 |
| 2023/0356541 A1* | 11/2023 | Rosset | B42D 25/455 |

FOREIGN PATENT DOCUMENTS

| | | | | |
|---|---|---|---|---|
| JP | 2004351840 | A | * | 12/2004 |
| JP | 2008162165 | A | * | 7/2008 |
| JP | 2010099870 | A | * | 5/2010 |
| JP | 2011042074 | A | * | 3/2011 |
| JP | 5224175 | B2 | * | 7/2013 |
| JP | 6278299 | B2 | * | 2/2018 |
| KR | 20090065011 | A | * | 6/2009 |
| KR | 20130107430 | A | * | 10/2013 |

* cited by examiner

CASE WITH ILLUSORY DESIGN ELEMENTS

TECHNICAL FIELD

The present invention relates generally to the field of protective cases, and more particularly to a protective case having the appearance of three-dimensional ("3D") shaped design elements embedded therein and to a method of manufacturing thereof.

BACKGROUND

Cases and covers for mobile phones, tablet computers and other handheld electronic devices may include ornamental decorative elements or visual displays. Continuing improvements in the field are sought. It is to the provision of an electronic device case with an appearance of 3D design elements embedded therein and methods of manufacturing thereof that the present invention is primarily directed.

SUMMARY

In example embodiments, the present invention provides an electronic device case appearing to have 3D design elements embedded therein when in fact, there are no actual 3D design elements embedded therein. The electronic device case generally comprises a back panel having a first, inner back plate and a second, outer back plate. The first and second back plates include corresponding design features wherein the corresponding design features produce an optical illusion as if 3D design elements are embedded in the back panel.

In other example embodiments, the present invention provides methods of producing a transparent or translucent case incorporating optical illusion to appear as if 3D elements are embedded in the case. The methods generally include forming a plurality of panels with one or more design features and assembling the panels so that the design features are aligned with one another to produce the optical illusion as if one or more 3D elements are embedded in the case.

In one aspect, the present invention relates to an electronic device case comprising a back panel having a first back plate and a second back plate. The first back plate comprises at least one 3D shaped impression and the second back plate comprises at least one design feature corresponding to the at least one 3D shaped impression. The combination of the first and second back plates and alignment of the at least one 3D shaped impression to the at least one design feature produces an optical illusion as if of one or more 3D design elements are embedded in the back panel.

In another aspect, the invention relates to a method of producing a case using optical illusion to appear as if one or more design elements are embedded therein. The method comprises the steps of forming a first panel with at least one first impression formed on a first side of the first panel, applying a reflective coating to the at least one first impression, forming a second panel, and joining the second panel to the first side of the first panel.

In yet another aspect, the invention relates to a method of producing a case including the steps of forming a first panel with at least one first impression formed thereon, These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
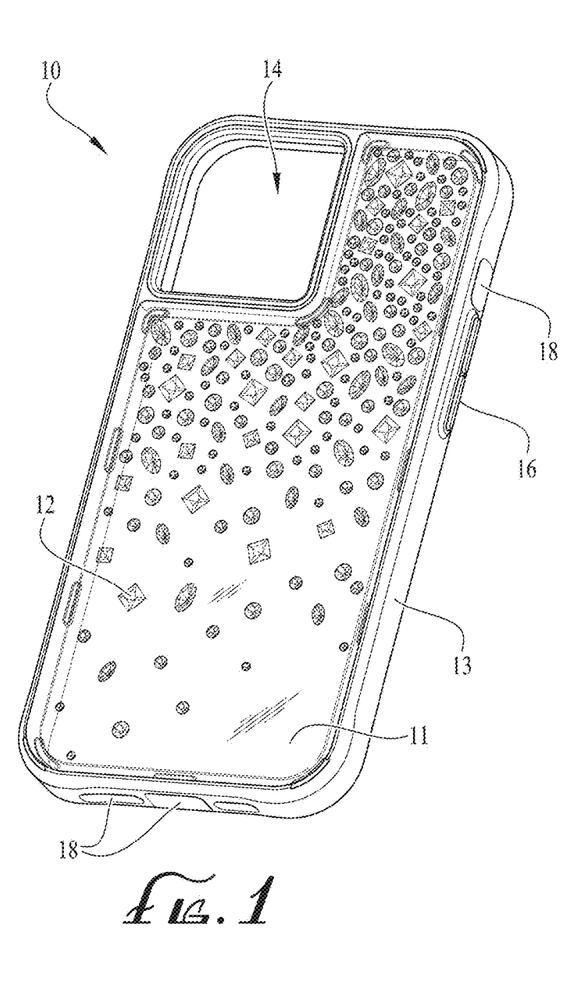
FIG. 1 is a rear perspective view of an electronic device case according to an example embodiment of the present invention.

With reference now to the drawing figures, wherein like reference numbers represent corresponding parts throughout the several views, FIG. 1 shows an electronic device case 10 with a transparent or translucent back panel 11 according to an example embodiment of the invention. The case 10 defines a space or housing for receiving an electronic device such as for example a smart phone, tablet computer or other handheld electronic device. The case generally comprises a frame 13 coupled to or projecting from the back panel 11. The frame is configured to surround the outer periphery of the electronic device and the back panel 11 is configured to cover the back of the electronic device.

According to example embodiments, the frame 13 generally includes a plurality of outer sidewalls that are connected by rounded corners and which surround a center recess or cutout configured to receive, for example, an electronic device. According to example embodiments, the frame 13 comprises one or more cutouts 18 that are configured to provide access to one or more portions of the electronic device when the case 10 is assembled with the electronic device. One or more buttons 16 can optionally be provided for movable engagement within the cutouts to facilitate access or manipulation of one or more portions of the electronic device, such as for example, buttons, switches and/or other user interfaces. According to example embodiments, the back panel 11 comprises one or more cutouts 14 configured to provide access to other portions of the electronic device, such as for example, a camera, a light source or other components of the electronic device.

In example embodiments, the frame 13 is generally overmolded to or on, or co-molded with, the back panel 11. In example embodiments, the frame 13 can be formed of a soft, relatively flexible material, for example thermoplastic polyurethane (TPU). In example embodiments, the frame 13 is configured to be resilient to allow the device to be push fitted into the frame. In example embodiments, the frame material is a clear, transparent material. In other embodiments, the frame material is a tinted or translucent material. In alternate embodiments, the frame material is opaque. In example embodiments, portions of the back panel 11 are formed from a hard plastic material such as for example polycarbonate (PC) or soft plastic material such as for example TPU. In example embodiments, the back panel material is a clear, transparent material. In other embodiments, the back panel material is a tinted or translucent material.

According to example embodiments, the back panel 11 includes visual design features or elements 12 which appear visually as if 3-dimensional (3D) objects, such as for example gems or crystals, are embedded in the back panel. In actuality, the design elements 12 are 3D crystal shaped impressions or recesses formed directly on the back panel, or portions thereof, and arranged throughout the back panel to appear as if gems or crystals are embedded in the back panel, when in fact no actual gems or crystals are embedded therein. In other words, the present invention creates an optical illusion of actual gems or crystals being embedded in the back panel of the case without the expense or effort required to manually add such elements. The visual design elements 12 can be for example a variety of shapes and include metallic or holographic features and/or other visual effect elements. According to example embodiments, the design elements 12 can be generally uniformly distributed throughout the back panel 11, or alternatively, be deliberately positioned throughout the back panel 11. For example, the design elements 12 can be arranged in a pattern or can be randomly positioned throughout the layer.

Figure 2:
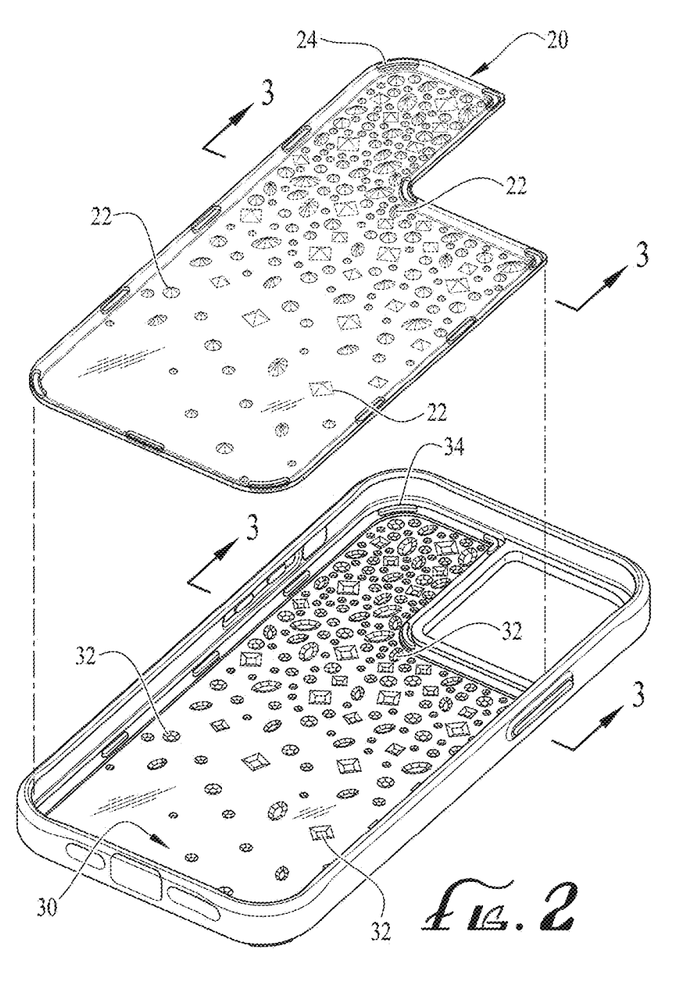
FIG. 2 is an exploded perspective view of the electronic device case of FIG. 1, showing a frame overmolded to an outer panel and an inner panel aligned to the outer panel.
Figure 3:
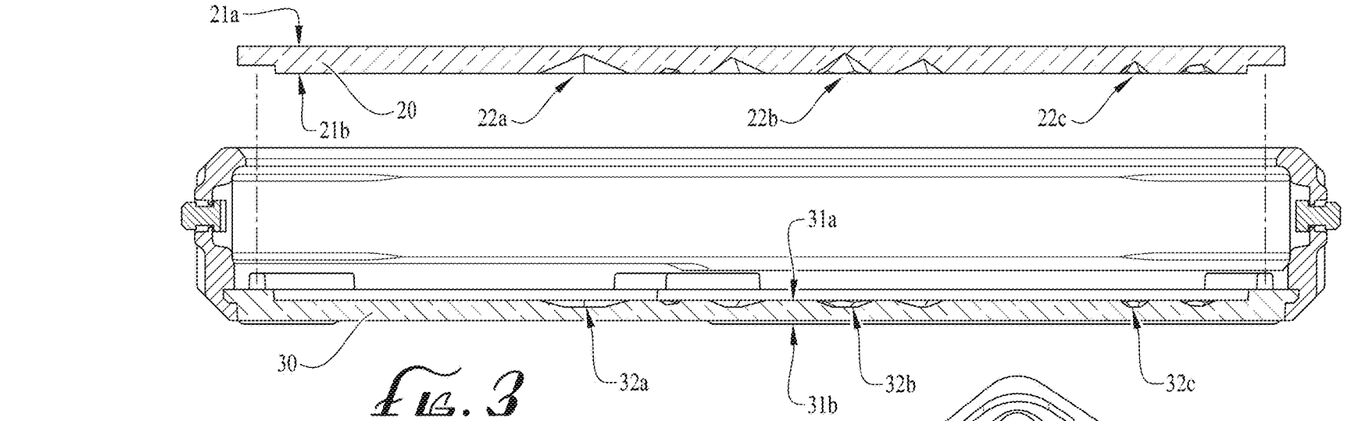
FIG. 3 is a cross-sectional view of the electronic device case of FIG. 2 taken along line 3-3, and showing example cross-sectional profiles of 3D point crystal shapes impressed on the inner and outer panels and the alignment of 3D point crystal shapes on the inner and outer panels.

According to example embodiments of the present invention, the back panel generally comprises a plurality of (i.e., two or more) layers or plates with 3D impressions formed in or on at least one of the layers or plates. For example, in the depicted embodiment shown in FIGS. 2 and 3, the back panel 11 comprises an inner plate or layer 20 and an outer plate or layer 30. The inner plate 20 comprises a first, front side 21*a* and a second, rear side 21*b*. Similarly, the outer plate 30 also comprises a first, front side 31*a* and a second, rear side 31*b*. In the depicted embodiment, the 3D impressions 22 are formed on the second, rear side 21*b* of inner plate 20 and 3D impressions 32 are formed on the first, front side 31*a* of outer plate 30. In example embodiments, the 3D impressions are concave or inward recesses formed in the plates by corresponding convex or outward mold features or projections in injection molding fabrication of the plates. In example embodiments, a plurality of impressions are formed in the plates to form an ordered or randomly arranged array of 3D impressions. In example embodiments, at least some of the 3D impressions include facets or edges at the intersection of adjacent flat or curved surfaces oriented at oblique angles relative to one another (e.g., having an inverse configuration to a faceted gemstone, crystal or jewel surface). In example embodiments, the 3D impressions 22 and 32 are configured and positioned in the same relative manner or arrangement such that when the second, rear side 21*b* of the inner plate 20 is mated to the first, front side 31*a*, 3D impressions 22 match up to 3D impressions 32. For example, in FIG. 3, the 3D impressions 22*a*, 22*b* and 22*c* and 3D impressions 32*a*, 32*b* and 32*c* are positioned on the inner plate 20 and outer plate 30, respectively, such that when rear side 21*b* of the inner plate is mated to the front side 31*a* of the outer plate, 3D impressions 22*a*, 22*b* and 22*c* align with 3D impressions 32*a*, 32*b* and 32*c*, respectively.

In the depicted embodiments, the 3D impressions are formed on only one side of the inner and/or outer plates and extend only partially therethrough. In other words, the depth of the 3D point crystal shapes is less than the thickness of the inner and outer plates. In other example embodiments, the back panel may comprise three or more layers and 3D impressions may be formed on both sides of the inner layers to create an appearance of gems or crystals embedded at different depths or levels within the back panel. In other example embodiments, 3D impressions may be provided only on one of the inner or outer plates. For example, as shown in FIG. 7B, 3D impressions 122 may be formed on inner plate 120 while outer plate 130 is left unmodified as a substantially flat plate without any 3D impressions. In some example embodiments, a film 110 having one or more reflective or holographic elements 112 is optionally applied to the outer plate 120. Preferably, the holographic elements 112 are shaped and arranged throughout decorative film 110 to match and align with the 3D impressions 122.

Figure 4A:
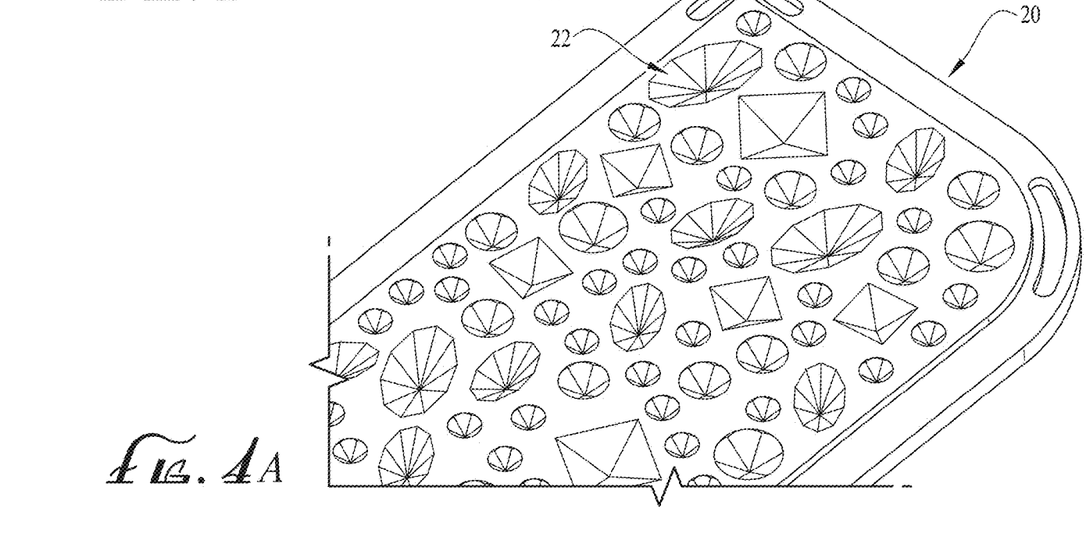
FIGS. 4A-4C depict the steps of manufacturing an example inner panel according to one example method of the present invention.
Figure 4B:
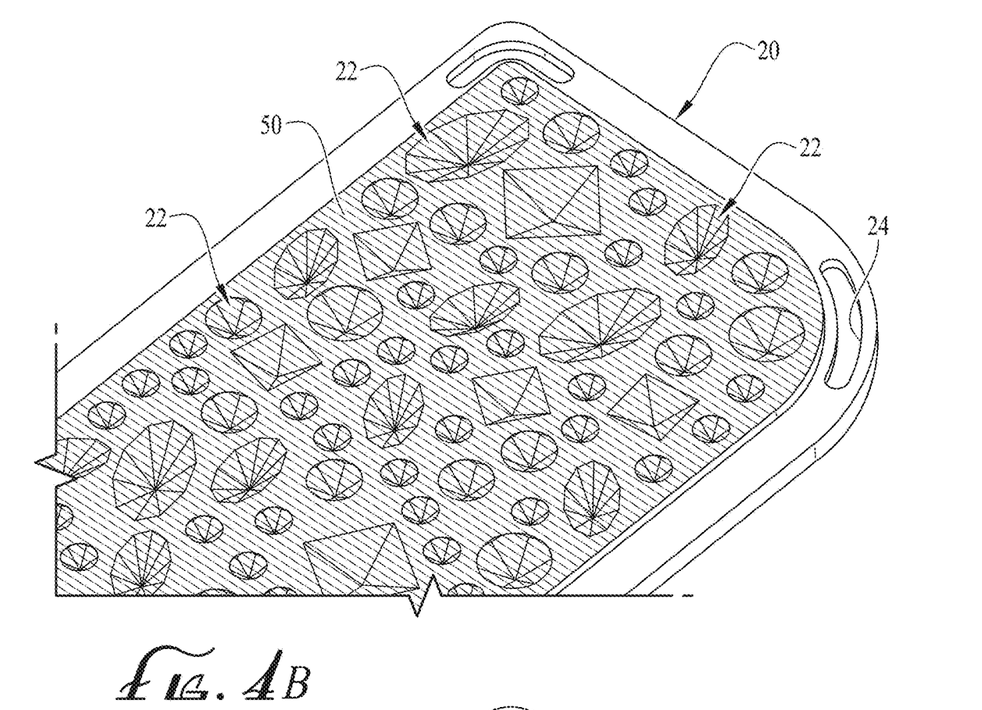
Figure 4C:
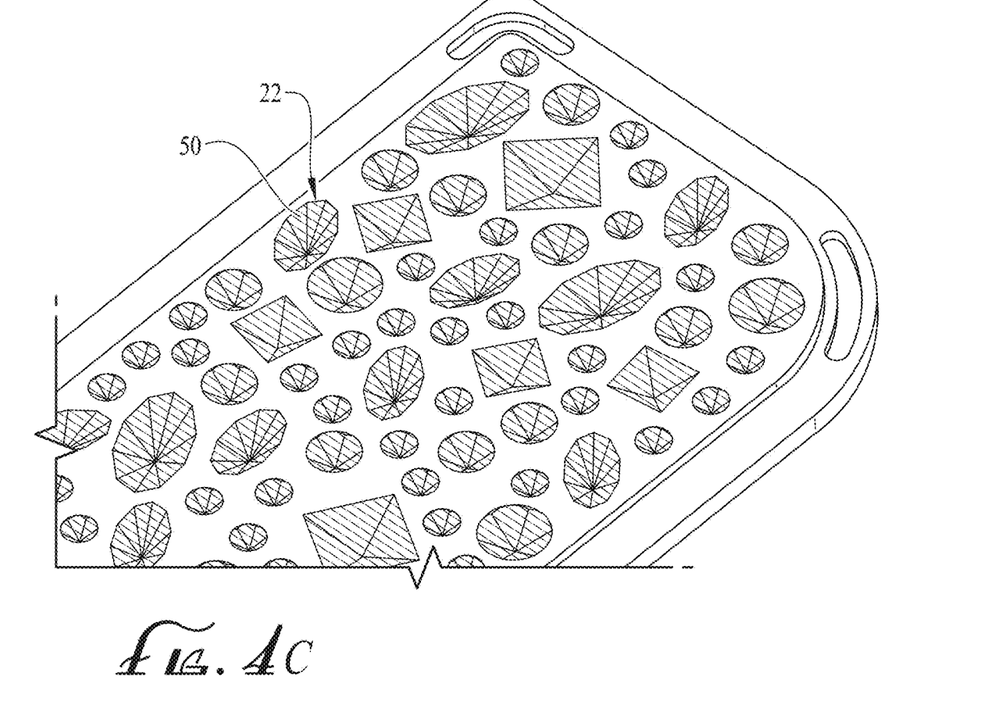
Figure 5A:
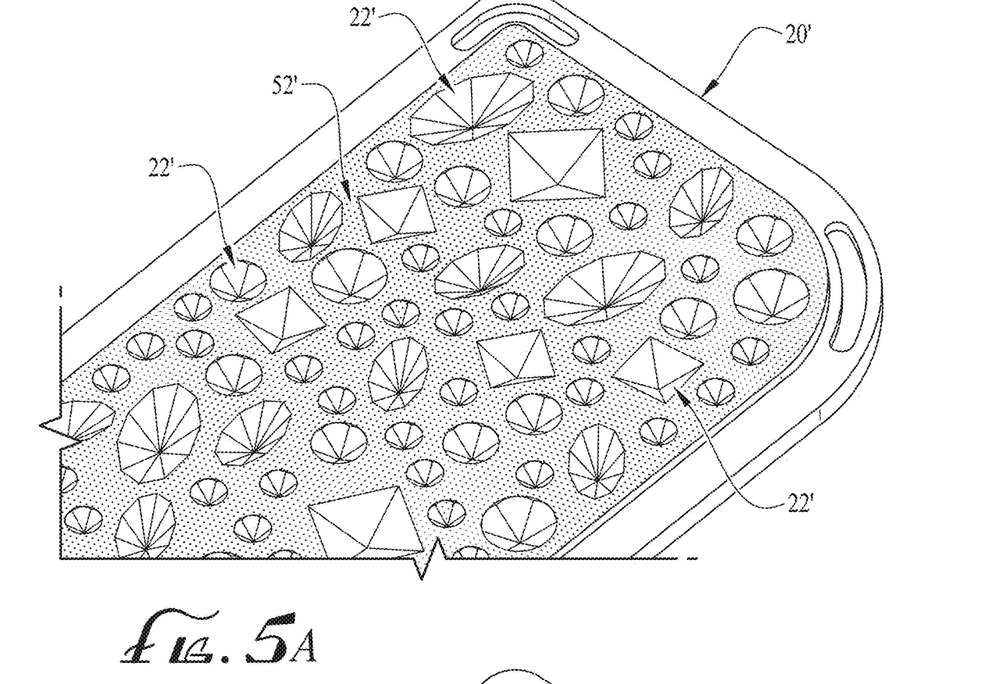
FIGS. 5A-5D depict the steps of manufacturing the example inner panel according to another example method of the present invention.
Figure 5B:
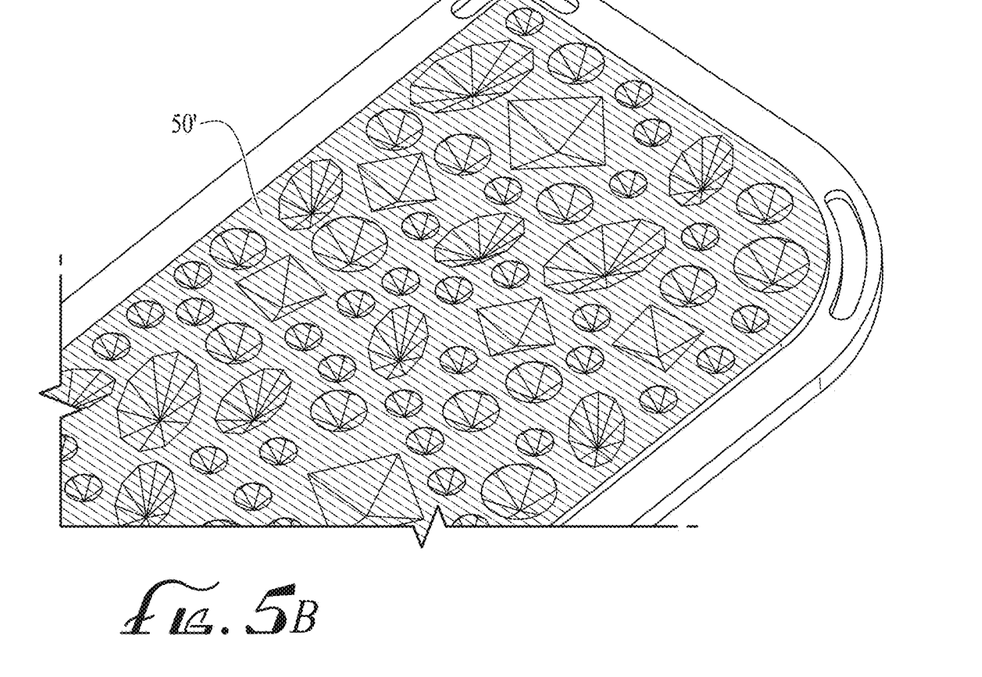
Figure 5C:
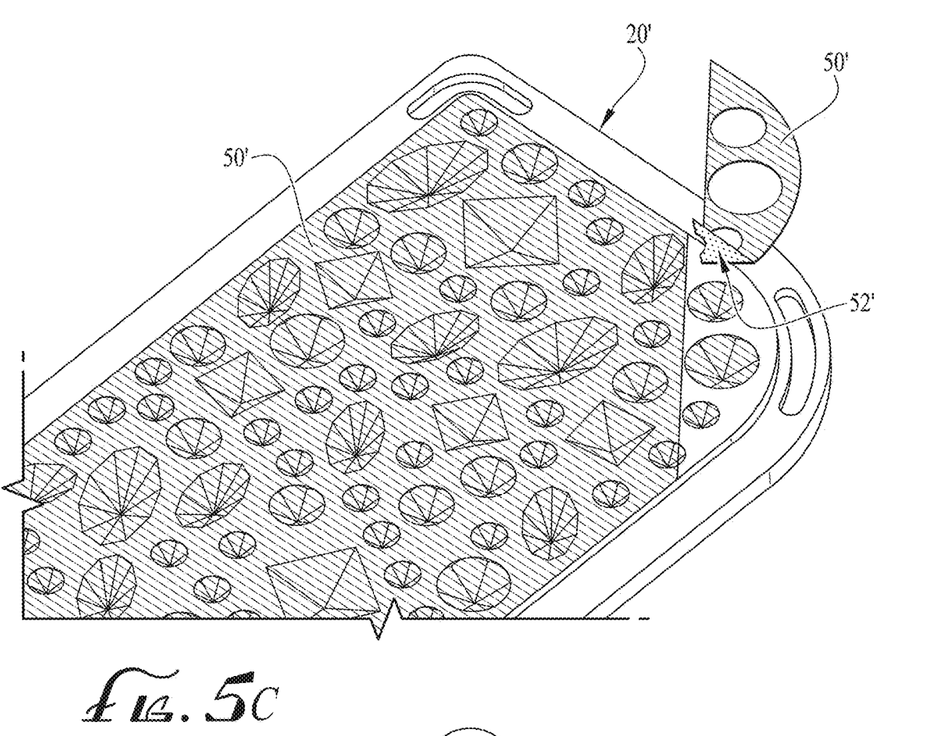
Figure 5D:
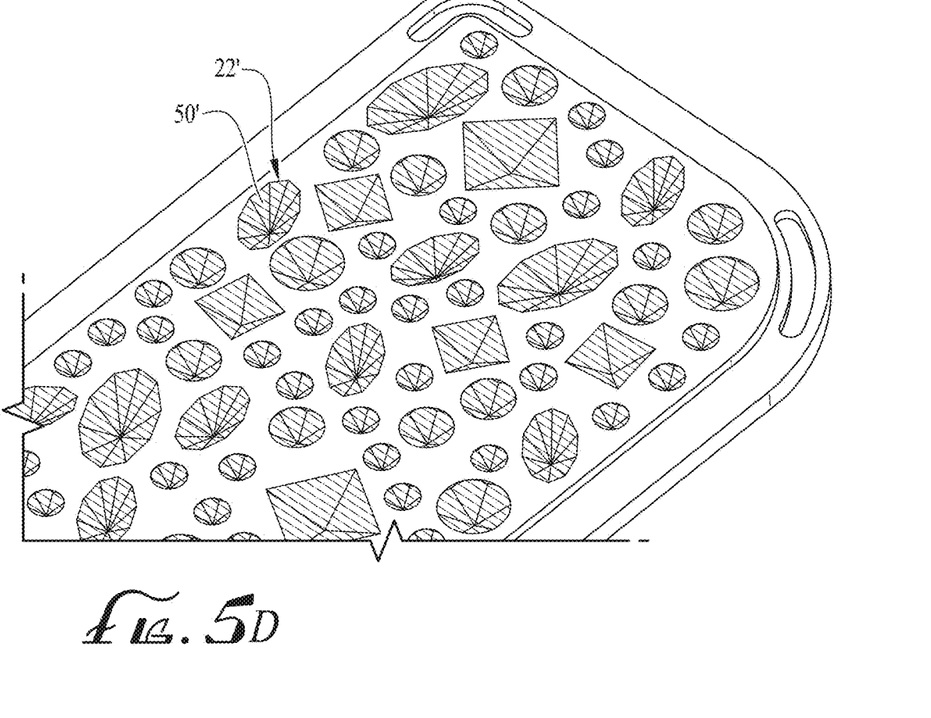

In example embodiments, the 3D impressions 22 on the inner plate 20 are for example coated or plated with a reflective or metallic finish (see, for example, non-conductive plating 50 in FIG. 4C). In example embodiments, the reflective finish is provided to enhance the reflection of light off the various facets of the 3D impressions and give off the illusion or mimic the appearance of light reflecting off of gems and/or crystals.

According to example embodiments of the present invention, the inner and outer plates 20,30 also include locating features 24 and 34, respectively, to help align one plate to the other. In example embodiments, outer plate 30 includes a plurality of raised features 34 and inner plate 20 includes a plurality of complementary cutout features 24 arranged and configured to fit or snap onto the raised features 34. In example embodiments, the mechanical engagement between the locating features 24 and 34 is sufficient to secure the inner plate 20 to the outer plate 30 and prevent any unintended detachment. In some example embodiments, adhesives and/or other bonding agents may be used independently or in conjunction with the locating features to join inner and outer plates together. In still other example embodiments, the inner and outer plates may be permanently joined together by injecting for example thermoplastic polyurethane, or other materials having similar properties, therebetween.

According to example embodiments of the present invention, there are various methods of manufacturing the inner and outer plates and various methods of assembling the inner and outer plates to produce the electronic device cases described herein. FIGS. 4A-7B show steps of optional manufacturing processes for producing an electronic device case 10 having illusory design features which appear as if physical objects, such as for example gems and crystals, are embedded within the case. FIG. 8 shows a general flow diagram of producing the electronic device cases described herein.

FIGS. 4A-4C show the manufacturing process steps 200, 202a, 204a and 206 for producing the inner plate 20 according to an example embodiment of the present invention. The inner plate 20 is produced using an injection molding process. In example embodiments, the injection mold is preferably designed and configured to produce the inner plate 20 with a desired arrangement of 3D impressions 22, such as for example 3D point crystal shapes. In the depicted embodiment, the inner plate 20 is molded with 3D impressions 22 formed only on one side or face (see FIG. 4A). In example embodiments, a reflective or metallic coating 50, such as for example non-conductive vacuum metalization (NCVM) coating, is applied to the side of the inner plate 20 with the 3D impressions 22 (see FIG. 4B). According to example embodiments, the metallic coating 50 is then laser etched, or otherwise removed, from the inner plate 20 leaving the metallic coating 50 applied only on the 3D impressions 22 (see FIG. 4C). A protective coating may be applied over the inner plate to further protect the metallic coating applied to the 3D impressions.

FIGS. 5A-5D show the manufacturing process steps 200, 202b, 204b and 206 for producing the inner plate 20' according to another example embodiment of the present invention. The inner plate 20' is first produced using an injection molding process. In example embodiments, the injection mold is preferably designed and configured to produce the inner plate 20' with a desired arrangement of 3D impressions 22', such as for example 3D point crystal shapes. In the depicted embodiment, the inner plate 20' is molded with 3D impressions 22' formed on just one of its sides or faces (see FIG. 5A). In example embodiments, a removable adhesive 52' is silkscreened, or otherwise applied, to the surface of the inner plate 20' surrounding 3D impressions 22' (see FIG. 5A). Preferably, application of the removable adhesive 52' on the 3D impressions 22' should be avoided. In example embodiments, a reflective or metallic coating 50', such as for example non-conductive vacuum metallization (NCVM) coating, is applied to the side of the inner plate 20' with the 3D impressions 22' (see FIG. 5B). According to example embodiments, the metallic coating 50' is then peeled, or otherwise removed, from the inner plate 20'. In example embodiments, peeling the metallic coating 50' removes only the portions applied over the removable adhesive 52' thereby leaving behind the metallic coating 50' applied to the 3D impressions 22' (see FIG. 5D). A protective coating may be applied over the inner plate to further protect the metallic coating applied to the 3D impressions.

Figure 6A:
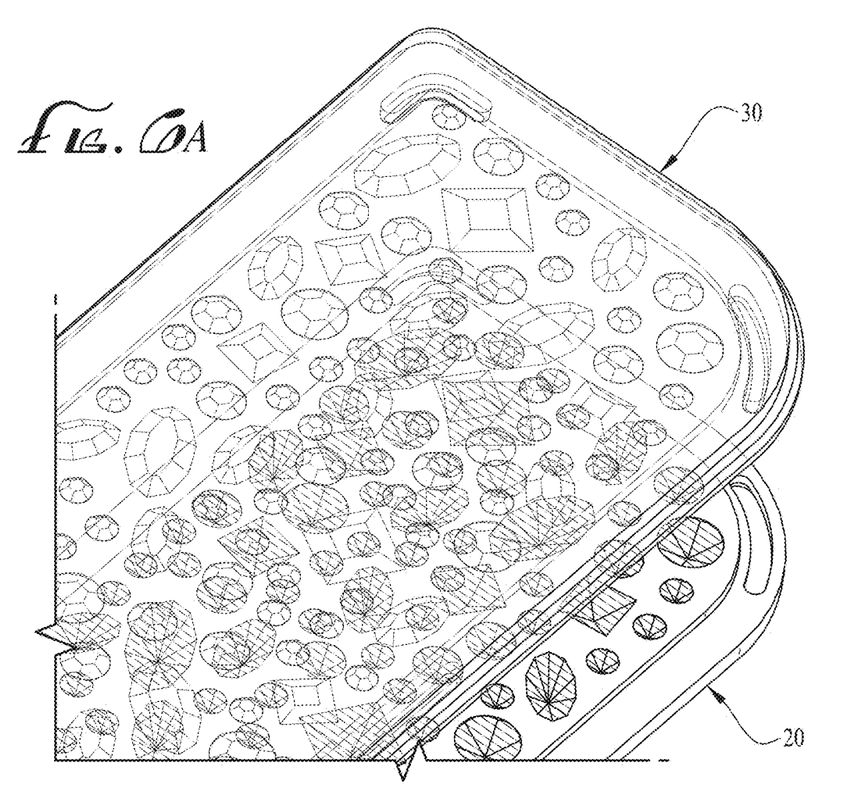
FIGS. 6A-6B depict the steps of attaching an inner panel to an outer panel according to one example method of the present invention.
Figure 6B:
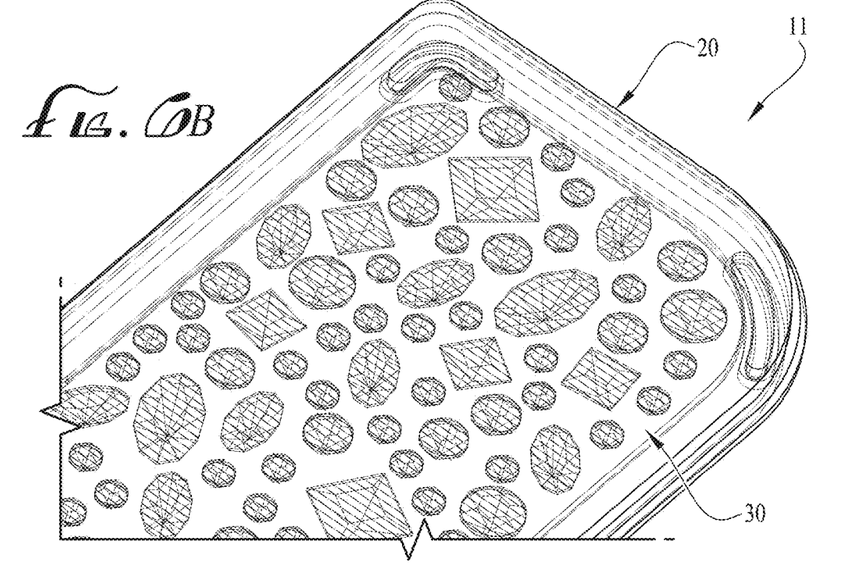

FIGS. 6A-6B show the manufacturing and assembly process steps 208b and 210b for producing the outer plate 30 and assembling the base panel 11 according to an example embodiment of the present invention. The outer plate 30 is produced using for example an injection molding process. In example embodiments, the injection mold is preferably designed and configured to produce the outer plate 30 with a desired arrangement of 3D impressions 32, such as for example 3D point crystal shapes. In the depicted embodiment, the outer plate 30 is molded with 3D impressions 32 formed on the side or face adjacent the inner plate 20 (see FIG. 6A). According to example embodiments, the inner plate 20 and outer plate 30 are joined or coupled together using locating features 24, 34 and adhesive, thermal or solvent bonding, press-fitting, snap-fit coupling. mechanical fasteners, or other attachment means. The assembly process is completed by overmolding, or otherwise securing, frame 13 to the base panel assembly 11.

Figure 7A:
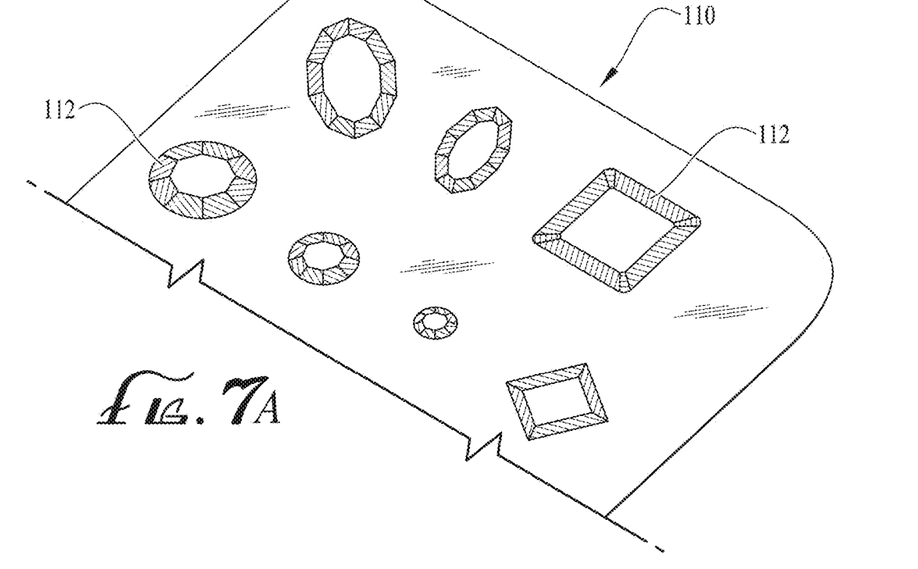
FIGS. 7A-7B depict the steps of attaching the inner panel to the outer panel according to another example method of the present invention.
Figure 7B:
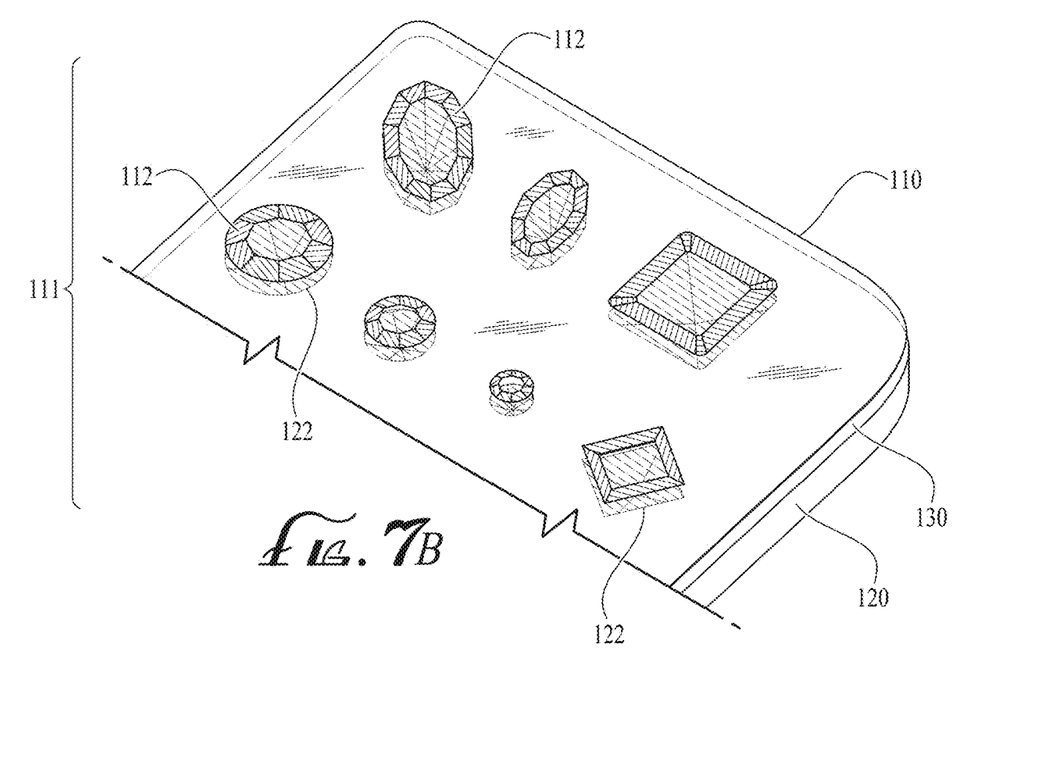
Figure 8:
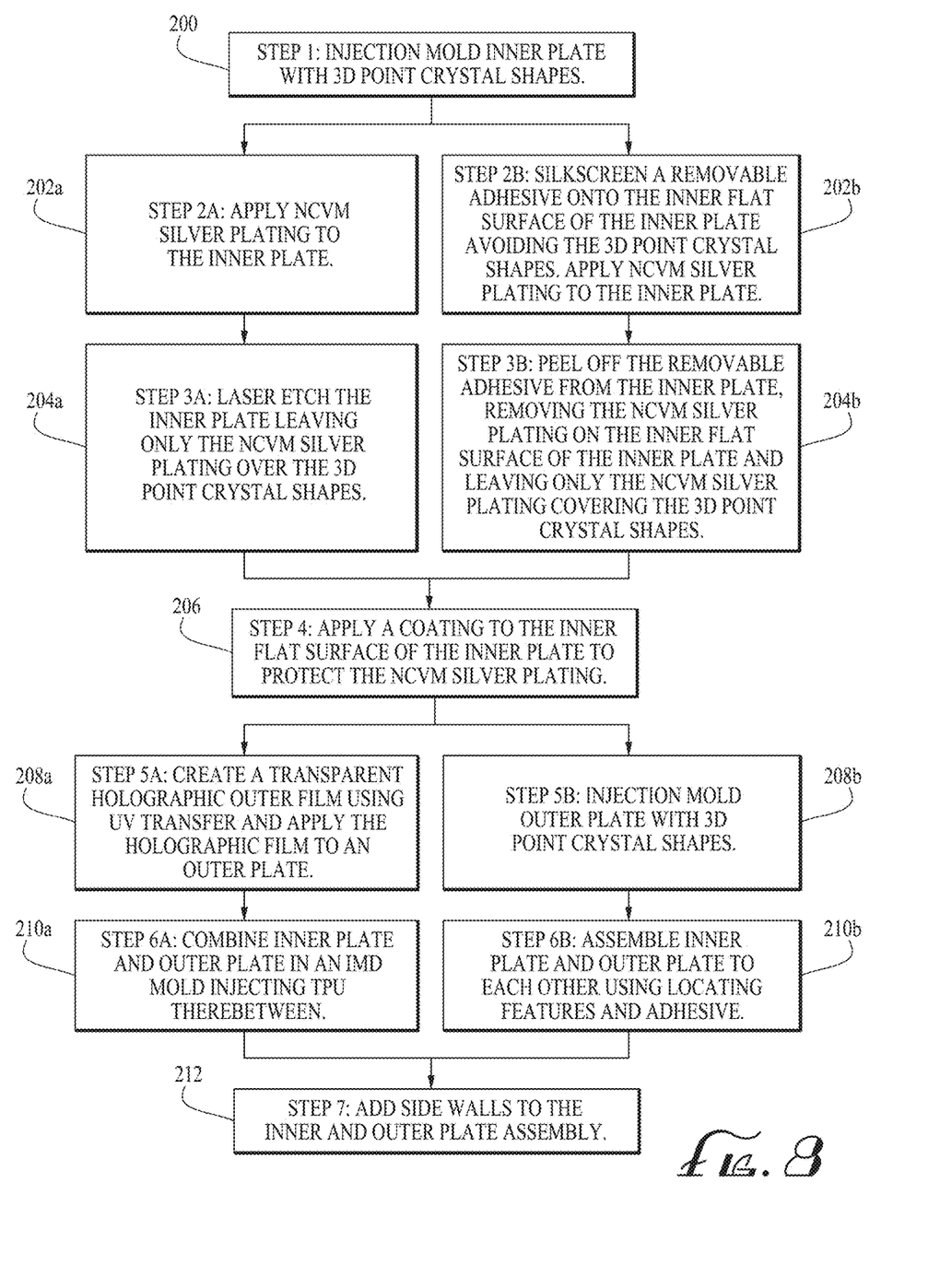
FIG. 8 is a flow diagram of a producing an electronic device case according to an example embodiment of the present invention.

FIGS. 7A-7B show the manufacturing and assembly process steps 208a and 210a for producing a transparent holographic film 110, an outer plate 130 and assembling the base panel 111 according to another example embodiment of the present invention. In the depicted embodiment, the outer plate 130 is a flat panel without any 3D impressions. In example embodiments, the holographic outer film 110 is created using for example UV transfer. The holographic outer film includes one or more holographic elements 112 having patterns resembling crystal top facets and is applied to one side or face of the outer plate 130. In example embodiments, the one or more holographic elements 112 are configured and arranged on film 110 such that the one or more holographic elements 112 align with 3D impressions 122 of the inner plate 120 when assembled (see for example FIG. 7B). In example embodiments, the inner plate 120 and outer plate 130 are combined in a two-film in-mold decoration (IMD) mold. TPU, for example molten TPU, is injected between the inner and outer plates permanently setting the combined plates to form base panel 111. In example embodiments, the holographic film 110 is applied to one side of the outer plate 130 and inner plate 120 is mated to other side of the outer plate 130. The assembly process is completed by overmolding, or otherwise securing, frame 13 to the base panel assembly 111.

In example modes of use, a case is provided according to the fabrication processes disclosed herein, and the case is installed onto a cellphone or other handheld electronic device to which the case is configured to fit and engage. The user may use the electronic device in typical fashion. The simulated or optical illusion 3D design elements are visible to an observer on at least one outer or external surface of the case with the electronic device engaged within the case. To the external observer, the 3D design elements present the appearance of actual gems, jewels, crystals, or other 3D elements embedded within the material of the case, when in fact no actual such elements are actually present. In alternate embodiments, some actual gems, jewels, crystals, or other 3D design elements may be present, in combination with some simulated or optical illusion 3D design elements as disclosed.

While the invention has been described with reference to example embodiments, it will be understood by those skilled in the art that a variety of modifications, additions and deletions are within the scope of the invention, as defined by the following claims.

What is claimed is:

1. An electronic device case, comprising:
a back panel comprising a first back plate, the first back plate comprising at least one impression, and a second back plate, the second back plate comprising at least one design feature corresponding to the at least one impression, wherein alignment of the at least one impression to the at least one design feature produces an optical illusion as if one or more actual 3D design elements are embedded in the back panel.

2. The electronic device case of claim 1, further comprising one or more transverse sidewalls extending from the back panel.

3. The electronic device case of claim 1, wherein the at least one impression is a multi-faceted 3D shaped impression.

4. The electronic device case of claim 1, wherein the at least one design feature is a 3D shaped impression.

5. The electronic device case of claim 1, wherein the at least one design feature is a holographic element.

6. The electronic device case of claim 1, wherein the alignment of the at least one impression and the at least one design feature produce an optical illusion as if one or more crystals embedded in the back panel.

7. The electronic device case of claim 1, wherein the at least one impression is coated with a reflective finish.

8. The electronic device case of claim 1, wherein the first or second back plates are transparent or translucent.

\* \* \* \* \*